Figure 1:
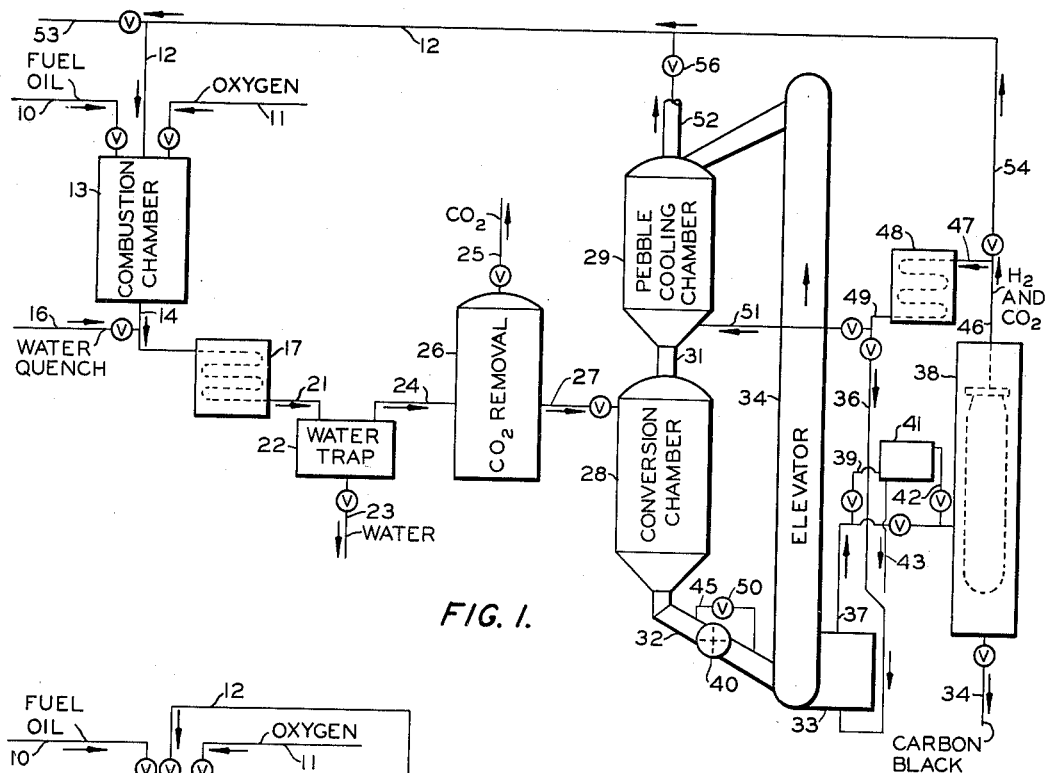

INVENTOR.
R.G. ATKINSON
BY Hudson and Young
ATTORNEYS

United States Patent Office 2,731,328
Patented Jan. 17, 1956

2,731,328

CARBON BLACK MANUFACTURE

Robert George Atkinson, Bartlesville, Okla., assignor to Phillips Petroleum Company, a corporation of Delaware Application May 29, 1950, Serial No. 164,878

5 Claims. (Cl. 23—209.4)

This invention relates to the manufacture of carbon black. In one embodiment it relates to the conversion of low-grade carbonaceous materials to carbon black. In another embodiment it relates to the utilization of a contiguous mass of flowable particulate solids in the manufacture of carbon black. In still another embodiment this invention relates to the manufacture of carbon black from a gas comprising carbon monoxide.

As is well-known in the art, carbon black has utility in various fields, particularly in the compounding of natural and synthetic rubbers.

I have discovered a process for the manufacture of a carbon black having special utility in the field of rubber compounding. Carbon black manufactured by the process of my invention, when compounded with natural or synthetic rubber, imparts excellent reinforcement characteristics to the finished stock, particularly as regards resistance of the finished rubber to abrasion.

My invention is concerned with the utilization of low-grade carbonaceous materials, such as pulverized coal, pitch, petroleum residua, gas oils, fuel oils, and the like, in the manufacture of carbon black, and in effecting such a process in conjunction with a moving contiguous mass of flowable solids, generally "pebbles" utilized in conjunction with a modified pebble heater system.

The term "pebble," as used throughout the specification, denotes any solid refractory material of flowable form and size that can be utilized to transfer heat from one zone to another. Pebbles are preferably substantially spherical and about $\frac{1}{32}$ inch to 1 inch in diameter, a preferred range generally being from about $\frac{1}{4}$ to $\frac{1}{2}$ inch. Pebbles are formed of a refractory material which will withstand temperatures at least as high as the highest temperature attained in the pebble heater system, and must be capable also of withstanding temperature changes within the system. Refractory materials, such as metal alloys, ceramics, or other satisfactory materials, may be utilized to form pebbles. For example, ceramics, alumina, periclase, thoria, beryllia, and mullite may be satisfactorily used to form such pebbles, or may be used in admixture with each other or with other materials. Pebbles formed of such materials, when properly fired, serve very well at high temperatures. Some pebbles withstand temperatures up to about 3500° F. Pebbles which are used may be either inert or catalytic, as desired.

A pebble system of the type referred to hereabove generally comprises a series of substantially vertically extending zones, often in vertical alignment with each other, and connected by relatively narrow interconnecting zones or throats. Generally, the top or upper zone is employed as a pebble heating chamber, and the succeeding lower zones as conversion zones, cooling zones, or the like, as required in the specific process. A combustion zone or chamber is positioned adjacent or in close proximity to the sides of the lower portion of the heating chamber, and combustion gas formed in the combustion chamber is passed through the mass of cooler pebbles in heat exchange relation therewith, in the pebble heating chamber. A hot gas source other than a combustion chamber is sometimes employed. A contiguous mass of particulate contact material, such as pebbles, fills the pebble heating zone, and each of the succeeding zones, together with the interconnecting zone or throats, and flows downwardly through these zones by gravity. Pebbles are discharged from the bottom of the lowermost zone of the series at a controlled rate, and returned, usually by elevating means, to the inlet in the upper portion of the pebble heating zone.

Pebble heater apparatus is generally employed in the thermal treatment or conversion of hydrocarbon materials. Operation of such a pebble heater system generally involves circulating a contiguous pebble mass through the entire series of pebble zones, including the interconnecting throats. That portion of the pebble mass descending through the heating chamber is heated to a suitable predetermined temperature above a desired treating or conversion temperature in heat exchange relation with a combustion gas or other hot gases from any desired source. Pebbles are often heated in the heating chamber to temperatures as high as from 2000 to 3000° F. and in some cases higher, dependent upon the temperature requirements of the subsequent treating step or steps. The pebbles thus heated are contacted directly with one or more materials to be treated in one or more zones of the pebble heating system under suitable time and temperature conditions to effect the desired treatment. The pebble mass, having given up heat to the material or materials treated, descends through the bottom of the lowermost chamber and is fed to an elevator for further handling, generally for transfer to an inlet at the top of the pebble heating chamber for reheating and recirculation through the system.

In a modified pebble heater system of my invention, I cool pebbles in a pebble cooling chamber, and control an exothermic reaction taking place in a pebble chamber downstream from the pebble cooling chamber. Pebbles in the downstream chamber, although they transfer an amount of heat necessary to initiate an exothermic reaction therein, absorb exothermic heat thus liberated in a manner to control the temperature of that exothermic reaction to a desired level, at which level maximum yields of desired carbon black product are obtained.

An object of my invention is to provide for the manufacture of carbon black.

Another object is to provide for the utilization of low-grade carbonaceous materials in the manufacture of carbon black.

Another object is to provide for the utilization of a modified pebble heating system in the manufacture of carbon black from a gas comprising carbon monoxide.

Another object is to provide for the manufacture of carbon black from carbon monoxide at a temperature below 1200° F.

Other objects will be apparent to those skilled in the art from the accompanying discussion and disclosure.

In accordance with one embodiment of my invention, a low-grade carbonaceous material is burned at a high temperature in the presence of free oxygen to produce carbon monoxide as a combustion product. The resulting combustion product is then quickly quenched to stabilize the carbon monoxide concentration therein, i. e., to quickly cool it to a temperature below which the well-known water gas shift equilibrium $CO + H_2O \rightleftarrows CO_2 + H_2$ can extensively take place to the $CO_2$ side. Such temperatures are preferably below 1200° F., and in any event are lower than 1600 to 1800° F. The quenched combustion gas is then contacted with pebbles in a conversion chamber under conditions causing carbon monoxide in the combustion gas to react exothermically to form carbon black, and carbon dioxide as a by-product, as illustrated by the equation $2CO \rightleftarrows C+CO_2$, and to a somewhat lesser extent to form carbon black, and water as a by-product; as illustrated by the equation, $$CO+H_2 \rightleftarrows C+H_2O$$

such conditions being regulated to provide for an absorption of the liberated exothermic heat of reaction by the pebbles, and for controlling the exothermic reaction temperature to a level providing for maximum yields of carbon black. I have found that in conducting the reaction in the conversion chamber at a temperature below 1200° F., more preferably from 900 to 1100° F., carbon black is produced from carbon monoxide in a maximum yield, and that if such temperatures exceed 1200° F. the yield of carbon black is rapidly diminished. Removal of exothermic heat in accordance with this invention permits the reaction to occur at a temperature level more favorable for the formation of carbon black from carbon monoxide. It is therefore an important object of my invention to effect such a conversion at a temperature below about 1200° F.

The relative rates of flow of gases and pebbles through the conversion chamber are dependent to a large extent on the concentration of carbon monoxide in the gas influent to the conversion chamber, and the specific heat of the influent pebbles thereto. Generally, however, the specific heat of pebbles manufactured from ceramics, alumina, or the like, i. e., non-catalytic materials of the type discussed hereabove, is sufficiently high and the content of the carbon monoxide in the influent gas is in such a range that when introducing pebbles and gas into the conversion chamber such an introduction is effected so as to maintain a weight ratio of influent pebbles to influent gas within the limits of from about 8:1 to 15:1. More generally, the specific heat of the pebble material is within the range of from 0.2 to 0.3, and the carbon monoxide content of the influent gas will be within the limits of 40 to 70 per cent, often from 50 to 60 per cent. For example, when the specific heat of the pebble influent material is 0.25, and the carbon monoxide content of the influent gas is about 50 per cent, an exothermic reaction temperature of about 1000° F. can be maintained when introducing pebbles into the conversion chamber in a weight ratio to influent gases of 11:1.

Figure 2:
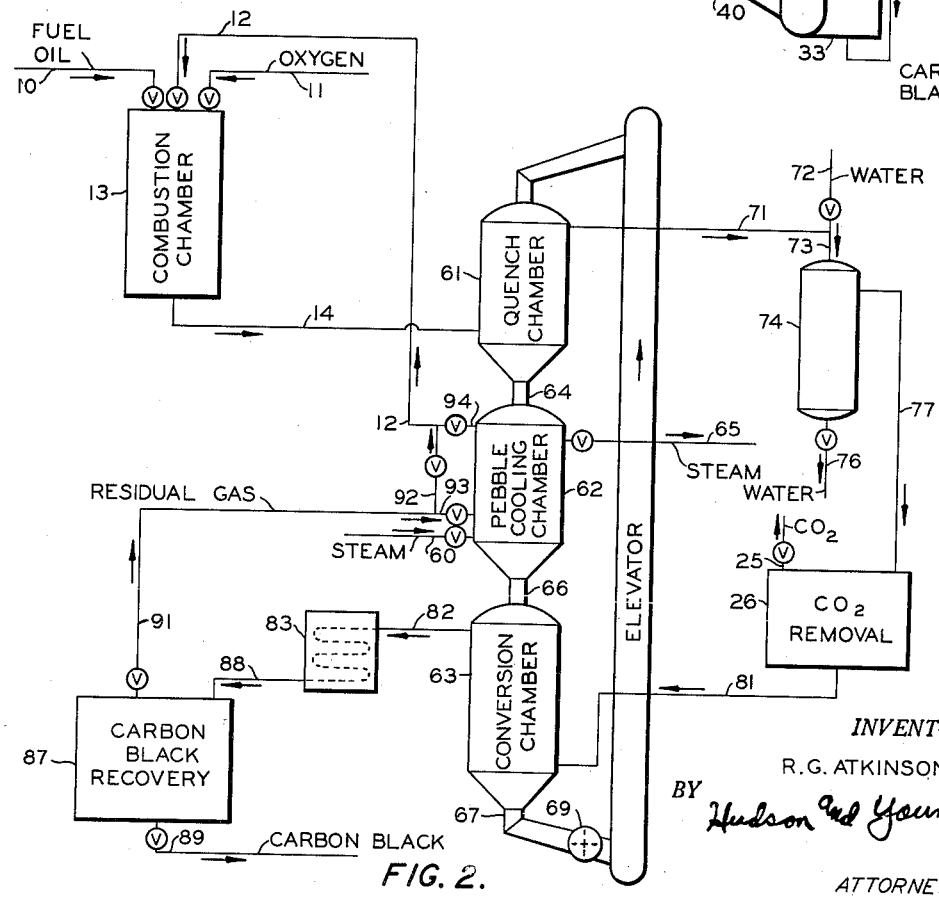

Reference is made to the drawings, Figures 1 and 2, each illustrating preferred embodiments of the process of my invention. It is to be understood that these figures are diagrammatic and may be altered in many respects by those skilled in the art, and yet remain within the intended scope of my invention. Figure 1 is illustrative of one form of my invention, wherein a hydrocarbon oil is burned to form a carbon monoxide-containing combustion gas mixture which is then contacted concurrently with a downwardly flowing mass of pebbles under controlled conditions to produce carbon black. Figure 2 illustrates another embodiment similar to that of Figure 1, except that the flow of carbon monoxide-containing gas influent is maintained in countercurrent flow relation with pebbles descending through a conversion chamber.

With reference to Figure 1, fuel oil from line 10 is introduced with oxygen from line 11, of commercial grade purity, i. e. 90 to 95 per cent or higher, together with a recycle stream from line 12 comprising a mixture of carbon dioxide and hydrogen described hereafter, into combustion chamber 13 and burned therein, in proportions to produce carbon monoxide in high yield. The mol ratio of oxygen to hydrocarbon introduced into chamber 13 is regulated to provide a combustion temperature preferably within the limits of 2000 to 3000° F., more often 2000 to 2500° F., under which conditions carbon monoxide is formed in high yield. The optimum ratio of oxygen to hydrocarbon utilized is dependent, of course, on the specific hydrocarbon being burned. However, I have found that a combustion temperature within the limits of 2000 to 2500° F. can be obtained when burning a hydrocarbon oil with oxygen, in an atomic ratio of oxygen to carbon in the oil within the limits of about 1.06:1 to 1.22:1. Under these conditions, carbon monoxide in high yield is present in the combustion product in a volume ratio to hydrogen of about 1:1, or slightly less. To effect the combustion at a temperature of from 2500 to 3000° F., an atomic ratio of oxygen to carbon in the oil within the limits of 1.22:1 to about 1.28:1 is employed. For example, when charging a combined feed consisting of 100 pounds of a fuel oil preheated to 400° F., 1500 cubic feet of carbon dioxide, 1700 cubic feet of oxygen, and 2500 cubic feet of hydrogen per unit time into chamber 13, the temperature of the burning reaction is 2400° F., and the combustion gas formed contains on a mol basis, 40 per cent carbon monoxide, 7 per cent carbon dioxide, 36 per cent hydrogen, and 17 per cent steam.

Effluent combustion gas from chamber 13 is withdrawn through line 14, and is quenched in direct heat exchange with water introduced into line 14 from line 16. Quenched combustion gas is passed from line 14 into indirect heat exchange with a cooling fluid in cooling zone 17. Cooling in zone 17 is effected so that the temperature of cooled effluent therefrom is within the limits of from 50 to 200° F. Effluent gas from chamber 17 is discharged through line 21 into water trap 22, wherein water is separated, and then discharged from zone 22 through line 23. Cooled combustion gas in zone 22, freed of water, is discharged through line 24 into carbon dioxide removal system 26, which can be any desired means for removing carbon dioxide. One well-known method is that of absorption of carbon dioxide from the gas by contacting same with an aqueous alkanol amine, as for example, monoethanol amine. Combustion gas, freed of carbon dioxide, is discharged from zone 26 through line 27 into an upper portion of a gas conversion chamber 28 of a pebble heater apparatus, and passed through chamber 28 concurrently with a mass of pebbles gravitationally introduced into chamber 28 from a pebble cooling chamber 29 disposed above chamber 28. The temperature of the influent gas into chamber 28 from zone 26 is dependent on the specific carbon dioxide removal step utilized. When conventional aqueous alkanol amine absorbents are employed, the temperature of influent gas to zone 28 is generally within the limits of from about 100 to 150° F. Pebbles cooled from a temperature of about 1000 to 1200° F. to a temperature within the limits of about 300 to 700° F., as described hereafter, are passed from chamber 29 into chamber 28 through throat 31. Upon contact of influent gases with pebbles in zone 28, that gas is heated to a temperature at which carbon monoxide therein initially reacts exothermically to form carbon black. The pebbles, upon contacting the influent gas, heat the gas as already mentioned, and the heat capacity of the pebbles suppresses excessive temperature rise so that the reacting gas, i. e., carbon monoxide, does not reach a temperature that is unfavorable to the production of carbon black in maximum yield. Accordingly, pebbles and total gaseous effluent discharged from zone 28 are at a temperature below 1200° F., and preferably in the range of about 900 to 1100° F., dependent upon the temperature of the influent pebbles and of the influent gas, and on the ratio of pebbles to gas introduced into the conversion chamber. Pebbles and gaseous effluent are discharged from zone 28 through line 32 into pebble separation zone 33 at a temperature of about 900 to 1100° F., although in some cases that temperature will be as high as 1200° F. By gaseous effluent, I mean to include total effluent gas from chamber 28 containing suspended carbon black product. The rate of pebble flow from zone 28 is regulated by any suitable pebble feeder means in line 32, such as star valve 40. Gas effluent flow from zone 28 via line 32 to zone 33 can be facilitated by by-pass line 45 containing valve 50.

around feeder 40. Pebbles are removed from zone 33 and passed by elevating means 34 into chamber 29 at their existing temperature which generally approximates about 1000° F., as already discussed. Total gaseous effluent is cooled by admixing therewith a stream comprising hydrogen and carbon dioxide from line 36, previously cooled to a temperature as low as 100° F. or lower, as described hereafter. The gaseous admixture thus formed is passed from zone 33 via conduit 37 into carbon black separation means 38, generally a system of bag filters of the type well-known in the art for separating suspended solids from gases. Effluent gas in line 37 is passed through cooler-condenser zone 41 and cooled therein as desired, preferably to condense steam formed as by-product in chamber 28. Steam condensate thus formed is removed from zone 41 through line 43. Gases, substantially water free, comprising carbon dioxide and hydrogen containing carbon black suspended therein, are passed from zone 41 via line 42 to zone 38. In some cases the amount of by-product steam formed is so small that its presence can be ignored, and in such a case, gases in line 37 can be passed directly to zone 38, or first cooled as desired in zone 41 without condensing by-product steam. In any event, the temperature of the gaseous stream admitted into zone 38 when utilizing bag filters therein is preferably below about 400° F. for the reason that higher temperatures are not easily withstood by such type equipment. However, dependent upon the type of carbon black separation means employed in zone 38, the temperature of gaseous introduced thereinto from line 37 may be varied accordingly. Carbon black is filtered from the influent gases to zone 38 and withdrawn from zone 38 through line 34. Residue gas separated in zone 38 is discharged through line 46. Residue gas in line 46 comprises hydrogen and carbon dioxide and is passed in at least a major proportion from line 46 through line 47, cooler 48, and discharged from cooler 48 into line 49. Gas in line 49 is cooled to a temperature as low as from 100 to 200° F. A portion of the gas in line 49 is passed through line 36 into pebble separation means 33 to cool gaseous effluent therein, as already described.

A remaining portion of cooled gas in line 49 is passed through line 51 into the lower portion of chamber 29 in countercurrent flow to gravitationally moving pebbles introduced thereinto by elevating means 34 at a temperature approximating 1000° F., as already discussed. Gas from line 51 is passed in countercurrent flow relation with pebbles in zone 29, and in heat exchange therewith to cool the pebbles to a temperature within the limits of about 300 to 700° F. for utilization in chamber 28. Residue gas thus heated in zone 29 is discharged therefrom through line 52 and passed into line 12 for utilization in the burning step, already discussed.

Any residue gas in the line 46 not passed into zone 48 is passed through line 54 without any additional cooling and recycled through line 12 into chamber 13. Any desired proportion of gases in line 12 can be withdrawn through line 53. This is particularly advantageous with respect to removing nitrogen from the system, introduced as an impurity in the oxygen, through line 11.

In one embodiment of my invention, as illustrated in Figure 1, I prefer to direct the flow of gases from pebble separation zone 33 into line 37 by maintaining a back pressure in chamber 29 greater than the pressure drop through chamber 38. This can be done by regulating valve 56 in line 52. Accordingly, at times there may be a slight flow of carbon dioxide and hydrogen through elevator 34 in a direction toward chamber 33. In this manner, pebbles are efficiently separated from carbon black product adhered to their surfaces, and from other product gases. Any gas thus returned to zone 33 from zone 29 can be passed from zone 38 through lines 54 and 12 to chamber 13.

Referring to Figure 2, a contiguous mass of pebbles is gravitationally passed through combustion gas quench chamber 61, pebble cooling chamber 62, and conversion chamber 63. A contiguous mass of pebbles thereby fills chambers 61, throat 64, chamber 62, throat 66, chamber 63, and pebble outlet 67 in the lower part of chamber 63. In this embodiment, pebbles are discharged from chamber 63 into elevating means 68 through line 67 at a rate controlled by means of star valve 69. The combustion of the fuel oil with oxygen and a carbon dioxide-hydrogen recycle stream in chamber 13 is the same as that described with respect to Figure 1. Effluent combustion gas discharged from chamber 13 at a temperature within the limits of 2000 to 3000° F. is quickly quenched by passing it in heat exchange relation with pebbles in quench chamber 61, introduced thereinto at a temperature approximating 1000° F., as described hereafter. Gases leaving chamber 61 are quenched to a temperature preferably below 1200° F. and in any case lower than from 1400 to 1800° F. in order to maintain a maximum concentration of carbon monoxide in the quenched gas. For example, when burning a mixture of fuel oil, oxygen, and recycle gas from line 12, in the proportions related in the discussion of Figure 1, effluent combustion gas in line 14 is at a temperature of 2400° F., and passed through chamber 61, it emerges at a temperature of 1100° F., a total of about 270,000 B. t. u.'s having been absorbed in the quench step. Pebbles in chamber 61 are heated as a result of the heat exchange relation therein, and passed downwardly through cooling chamber 62. For example, in the specific quench discussed above, pebbles entering chamber 61 at 1000° F. are passed through throat 64 at a temperature of about 1220° F. In order to utilize pebbles discharged from chamber 61 in conversion chamber 63 in a manner similar to that in chamber 28 of Figure 1, it is necessary to cool the pebbles to a temperature below 1200° F., and preferably within the limits of from 300 to 700° F., although in some cases higher temperatures may be utilized. Pebbles at a temperature approximating 1200° F., in chamber 62 are cooled by contacting the pebble mass in direct heat exchange relation with relatively cool steam, or any desired inert cooling gas at a predetermined low temperature sufficient for effecting the necessary amount of heat transfer. Relatively cool steam is introduced into chamber 62 through line 60. Steam is withdrawn from chamber 62, through line 65. In the example discussed immediately above, when passing 1540 pounds of steam through chamber 62, in at 320° F., the temperature of the pebble mass discharged through throat 66 is about 780° F., and steam is discharged at 1000° F. Chamber 62 provides therefore a means for cooling pebbles previously utilized for quenching combustion gas, and also for providing super-heated steam for any desired utilization outside the process system. Pebbles thus cooled in chamber 62 are passed downwardly through chamber 63.

Gaseous effluent is discharged from quench chamber 61 through line 71 and cooled in direct heat exchange relation with water from line 72 in line 73 to a temperature as low as from 100 to 200° F. The resulting cool admixture in line 73 is passed into water trap 74, wherein water is separated from the gas and then discharged from zone 74 through line 76. Gas thus freed of water is passed from zone 74 through line 77 to carbon dioxide separation means 26 of the type discussed hereabove. Carbon dioxide is separated from the gas in zone 26, and discharged through line 25. Combustion gas freed of carbon dioxide and water, and comprising carbon monoxide and hydrogen, is passed from zone 26 through line 81 into chamber 63 at a point in the lower portion thereof. Gas in line 81 is introduced into conversion chamber 63 at a temperature approximating from 100 to 200° F. and is heated in contact with pebbles therein to a temperature of about 700 to 800° F. causing carbon monoxide therein to react exothermically to form carbon black together with carbon dioxide and some water, as discussed hereabove. Total gaseous effluent is withdrawn from chamber 63 through line 82 and cooled from a temperature of about 1000° to 1200° F. to any desired lower temperature, such as from 100 to 200° F., in cooler 83 in indirect heat exchange relation therein with a cooling fluid. Total gaseous effluent comprising hydrogen, carbon dioxide, and carbon black suspended therein, cooled in chamber 83, is discharged into carbon black recovery zone 87 through line 88. Carbon black recovery employed in zone 87 may be of bag filter type already discussed, or any suitable separation means. Carbon black thus separated in zone 87 is withdrawn through line 89. Residual gas from the separation in zone 87 is discharged through line 91 and returned through line 92 to chamber 13 through line 12.

In some instances, dependent upon the temperature conditions utilized in chambers 61, 62, and 63, and upon the quantity of carbon dioxide-residue gas discharged from chamber 87, cooling in chamber 62 can be effected by passing all or a desired portion of the residue gas from chamber 87 through lines 91 and 93 in heat exchange relation with pebbles to be cooled in chamber 62, and the resulting heated residual gas withdrawn from chamber 62 through line 94 and passed into line 12 for utilization in chamber 13.

The relation of pebble flow to gas flow in the conversion chamber as discussed herein is substantially the same regardless of whether concurrent or countercurrent flow of pebbles and reactant gas is utilized.

It is to be understood that although I have described several embodiments of my invention in terms of the use of pebbles, as defined herein, my invention is not limited thereto. In a broader embodiment, any contiguous mass of flowable solid particulate materials can be utilized having a specific heat suitable for absorbing heat of reaction in the conversion chamber, as I have discussed hereabove. Generally, any such flowable solids mass having a specific heat within the limits of from 0.15 to 0.35 can be employed in the practice of my invention, and in some instances material can be employed having a specific heat outside that broad range.

In another embodiment, zone 62 can comprise a plurality of zones in series or in parallel, and residue gas can be passed from zone 87 in heat exchange relation with a smaller mass of pebbles in one of the plurality of pebble zones. In this manner, gas to be recycled to chamber 13 through line 12 can be preheated as required for burning in chamber 13, while at the same time steam or other cooling fluid can be utilized as required, and as illustrated in Figure 2, in cooling the pebble mass in zone 62.

Although I prefer to utilize a reaction pressure in zone 28 of from about atmospheric to 15–25 p. s. i. g., higher pressures can be employed if desired, as for example, from 100 to 400 p. s. i. g. or higher. Such higher pressures are particularly advantageous since the rate of reaction, i. e., the rate of conversion of CO to carbon black, is higher at higher pressures.

As will be evident to those skilled in the art, various modifications can be made or followed, in the light of the foregoing disclosure and discussion, without departing from the spirit or scope of the disclosure or from the scope of the claims.

I claim:

1. A process for the manufacture of carbon black, comprising admixing a hydrocarbon oil with oxygen and a stream of carbon dioxide and hydrogen described hereafter, in proportions to form carbon monoxide at a temperature of from 2000 to 3000° F. when the resulting admixture is burned; burning said admixture, whereby a combustion gas mixture is formed comprising carbon monoxide, hydrogen, carbon dioxide, and steam; quenching said combustion gas mixture to a temperature within the limits of 800 to 1200° F., whereby the concentration of carbon monoxide in said combustion gas mixture is maintained at a maximum; cooling the quenched combustion gas mixture to a temperature within the limits of 50 to 200° F. and removing water and carbon dioxide from the cooled gas; gravitationally passing a contiguous mass of pebbles from a source hereafter described through a conversion zone at an initial pebble inlet temperature within the limits of 300 to 700° F., and passing said cooled combustion gas freed of carbon dioxide and water through said chamber concurrently with said pebble mass therein, whereby said combustion gas is heated and carbon monoxide therein reacts exothermically to form carbon black together with carbon dioxide; maintaining a weight ratio of pebbles to gas introduced into said conversion zone within the limits of 8:1 to 15:1, whereby pebbles in said conversion zone absorb heat liberated from said exothermic reaction to maintain the temperature of said reaction below 1200° F.; discharging heated pebbles and total gaseous effluent from said conversion zone into a pebble-gaseous effluent separation zone and therein separating pebbles from said total gaseous effluent; said total gaseous effluent comprising a mixture of hydrogen, carbon dioxide, and carbon black suspended therein; cooling total gaseous effluent thus separated by mixing same in heat exchange relation with a cooler stream of carbon dioxide and hydrogen described hereafter, and passing the resulting admixture to a carbon black separation zone and therein separating the last said admixture into carbon black and total residual gas, said total residual gas comprising hydrogen and carbon dioxide; cooling at least a portion of said residual gas to a temperature within the limits of 100 to 200° F.; passing pebbles from said pebble-total gaseous effluent separation zone to a pebble cooling zone disposed above said conversion zone, passing a portion of cooled residual gas through said pebble cooling chamber in heat exchange relation with pebbles therein to cool said pebbles to a temperature within the limits of 300 to 700° F., said pebble cooling zone being the source above described of pebbles introduced into said conversion chamber; from said pebble cooling zone withdrawing a stream of said residual gas heated therein in heat exchange relation with hotter pebbles and admixing the withdrawn residual gas with said oil and oxygen as said stream of carbon dioxide and hydrogen, passing a portion of said cooled residual gas as said cooler stream of carbon dioxide and hydrogen with total gaseous effluent as described; and recovering carbon black from said carbon black separation zone.

2. The process of claim 1 wherein a portion of said residual gas separated in said carbon black separation zone is recycled without cooling as a portion of said stream of carbon dioxide and hydrogen admixed with said oil and oxygen.

3. A process for the manufacture of carbon black, comprising admixing a hydrocarbon oil with oxygen and a stream of carbon dioxide and hydrogen described hereafter, in proportions to form carbon monoxide at a temperature of from 2000 to 3000° F. when the resulting admixture is burned; burning said admixture, whereby a combustion gas mixture is formed comprising carbon monoxide, hydrogen, carbon dioxide, and steam; quenching said combustion gas mixture to a temperature within the limits of 800 to 1200° F., whereby the concentration of carbon monoxide in said combustion gas mixture is maintained at a maximum; cooling the quenched combustion gas mixture to a temperature within the limits of 50 to 200° F. and removing water and carbon dioxide from the cooled gas; gravitationally passing a contiguous mass of pebbles from a source hereafter described to a conversion zone at an initial pebble inlet temperature within the limits of 300 to 700° F., and passing said cooled combustion gas freed of carbon dioxide and water through said chamber concurrently with said pebble mass therein, whereby said combustion gas is heated and carbon monoxide therein reacts exothermically to form carbon black together with carbon dioxide; maintaining a weight ratio of pebbles to gas introduced into said conversion zone within the limits of 8:1 to 15:1, whereby pebbles in said conversion zone having a sufficiently high heat capacity absorb heat liberated from said exothermic reaction to maintain the temperature of said reaction below 1200° F.; discharging heated pebbles and total gaseous effluent from said conversion zone; said total gaseous effluent comprising hydrogen, carbon dioxide, steam, and carbon black suspended therein, separating steam and carbon black from said total gaseous effluent to provide a residual gas comprising hydrogen and carbon dioxide; recycling residual gas thus separated in admixture with said hydrocarbon oil and oxygen as said stream of carbon dioxide and hydrogen described hereabove; passing pebbles thus separated to a pebble cooling chamber disposed above said conversion chamber and passing a cooler gas through said pebble cooling chamber in heat exchange relation with pebbles to cool same to a temperature within the range of 300 to 700° F.; said pebble cooling chamber being the source of pebbles introduced into said conversion chamber as described above; and recovering carbon black as a product of the process.

4. A process for the manufacture of carbon black comprising admixing a hydrocarbon oil with oxygen and a stream of carbon dioxide and hydrogen described hereafter, in proportions to form carbon monoxide at a temperature within the limits of 2000 to 3000° F.; gravitationally passing a contiguous mass of pebbles through a first pebble zone, a second pebble zone disposed below said first pebble zone, and a third pebble zone disposed below said second pebble zone; burning the oil admixture formed as above described, whereby combustion gas is formed comprising carbon monoxide, hydrogen, carbon dioxide, and steam; quenching said combustion gas to a temperature within the limits of 800 to 1200° F. by passing same through said first pebble zone in contact with pebbles introduced thereinto at a temperature below 1200° F. as described hereafter, whereby the concentration of carbon monoxide in said combustion gas is maintained at a maximum; cooling the quenched combustion gas to a temperature within the limits of 50 to 200° F. and removing water and carbon dioxide from the cooled gas; cooling pebbles passed from said first pebble zone into said second pebble zone in heat exchange relation with a cooler gas as described hereafter, to a temperature within the limits of 300 to 700° F.; passing said cooled combustion gas through said third pebble zone in countercurrent flow relation with pebbles therein previously cooled in said second pebble zone, whereby said combustion gas is heated and carbon monoxide therein reacts exothermically to form carbon black together with carbon dioxide; maintaining a weight ratio of pebbles to gas introduced into said third pebble zone within the limits of 8:1 to 15:1, whereby pebbles in said third pebble zone having a high specific heat absorb heat liberated from said exothermic reaction to maintain the maximum temperature of said reaction below 1200° F.; discharging pebbles from said third pebble zone at said temperature below 1200° F. and passing the discharged pebbles into said first pebble zone; passing total gaseous effluent from said third pebble zone, said gaseous effluent comprising hydrogen, carbon dioxide, and carbon black suspended therein; cooling said gaseous effluent to a temperature below that of said pebbles introduced into said third pebble zone and passing the cooled effluent mixture to a carbon black separation zone, and therein separating same into carbon black and total residue gas, said total residue gas comprising carbon dioxide and hydrogen; withdrawing said residual gas from said carbon black separation zone and passing at least a portion of same through said second pebble zone in said heat exchange relation therein described above; from said second pebble zone withdrawing a stream of said residual gas heated therein in said heat exchange, and admixing same with said oil and oxygen as said stream of carbon dioxide and hydrogen; and recovering carbon black from said carbon black separation zone.

5. The process of claim 4 wherein a portion of residual gas withdrawn from said carbon black separation zone is admixed directly with said oil and oxygen as a part of said stream of carbon dioxide and hydrogen.

References Cited in the file of this patent

UNITED STATES PATENTS

| | | |
|---|---|---|
| 1,446,933 | Schnee | Feb. 27, 1923 |
| 1,964,744 | Odell | July 3, 1934 |
| 2,389,636 | Ramseyer | Nov. 27, 1945 |
| 2,423,527 | Steinschlaeger | July 8, 1947 |
| 2,432,520 | Ferro | Dec. 16, 1947 |
| 2,486,879 | Rees et al. | Nov. 1, 1949 |
| 2,526,652 | Garbo | Oct. 24, 1950 |